United States Patent
Tian et al.

(10) Patent No.: US 12,072,811 B2
(45) Date of Patent: Aug. 27, 2024

(54) NAMESPACE LEVEL VALID TRANSLATION UNIT COUNT

(71) Applicant: Micron Technology, Inc., Boise, ID (US)

(72) Inventors: Dahai Tian, Shanghai (CN); Jing Ping Lu, Shanghai (CN)

(73) Assignee: Micron Technology, Inc., Boise, ID (US)

( * ) Notice: Subject to any disclaimer, the term of this patent is extended or adjusted under 35 U.S.C. 154(b) by 83 days.

(21) Appl. No.: 17/775,090

(22) PCT Filed: Apr. 18, 2022

(86) PCT No.: PCT/CN2022/087366
§ 371 (c)(1),
(2) Date: May 6, 2022

(87) PCT Pub. No.: WO2023/201462
PCT Pub. Date: Oct. 26, 2023

(65) Prior Publication Data
US 2023/0333988 A1  Oct. 19, 2023

(51) Int. Cl.
*G06F 12/1009* (2016.01)
(52) U.S. Cl.
CPC ............................... *G06F 12/1009* (2013.01)
(58) Field of Classification Search
CPC .................................................. G06F 12/1009
See application file for complete search history.

(56) References Cited

U.S. PATENT DOCUMENTS

| 11,163,496 B1* | 11/2021 | Armangau | G06F 3/0653 |
| 2017/0262228 A1* | 9/2017 | Kanno | G06F 3/0616 |
| 2020/0133849 A1 | 4/2020 | Harris et al. | |

FOREIGN PATENT DOCUMENTS

| CN | 109558333 | 4/2019 |
| CN | 110321247 | 10/2019 |
| CN | 111831469 | 10/2020 |
| WO | 2023201462 | 10/2023 |

OTHER PUBLICATIONS

"International Application Serial No. PCT CN2022 087366, International Search Report mailed Dec. 29, 2022", 5 pages.
"International Application Serial No. PCT CN2022 087366, Written Opinion mailed Dec. 29, 2022", 3 pages.

* cited by examiner

*Primary Examiner* — Baboucarr Faal
(74) *Attorney, Agent, or Firm* — Schwegman Lundberg & Woessner, P.A.

(57) ABSTRACT

Aspects of the present disclosure configure a system component, such as a memory sub-system controller, to track a quantity of translational units stored for each of a plurality of namespaces on an individual namespace basis. To format a given one of the plurality of namespaces, the individually tracked quantity of translational units can be deducted from a global quantity tracked for each respective block of the memory sub-system.

20 Claims, 7 Drawing Sheets

| Block Num | VTC | NS0 VTC | NS1 VTC | NS2 VTC |
|---|---|---|---|---|
| Block 0 | 1000 | 200 | 300 | 500 |
| Block 1 | 2000 | 500 | 800 | 700 |
| ...... | ...... | ...... | ...... | ...... |
| Block N-1 | 1500 | 300 | 800 | 400 |

*FIG. 5*

NAMESPACE LEVEL VALID TRANSLATION UNIT COUNT

PRIORITY APPLICATION

This application is a U.S. National Stage Application under 35 U.S.C. 371 from International Application No. PCT/CN2022/087366, filed 18 Apr. 2022, which is incorporated herein by reference in its entirety.

TECHNICAL FIELD

Embodiments of the disclosure relate generally to memory sub-systems and more specifically, to tracking a valid translation unit count (VTC) on a namespace level in a memory sub-system.

BACKGROUND

A memory sub-system can be a storage system, such as a solid-state drive (SSD), and can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The present disclosure will be understood more fully from the detailed description given below and from the accompanying drawings of various embodiments of the disclosure.

FIG. 5 presents a table illustrating an example VTC table, in accordance with some implementations of the present disclosure.

DETAILED DESCRIPTION

Figure 1:
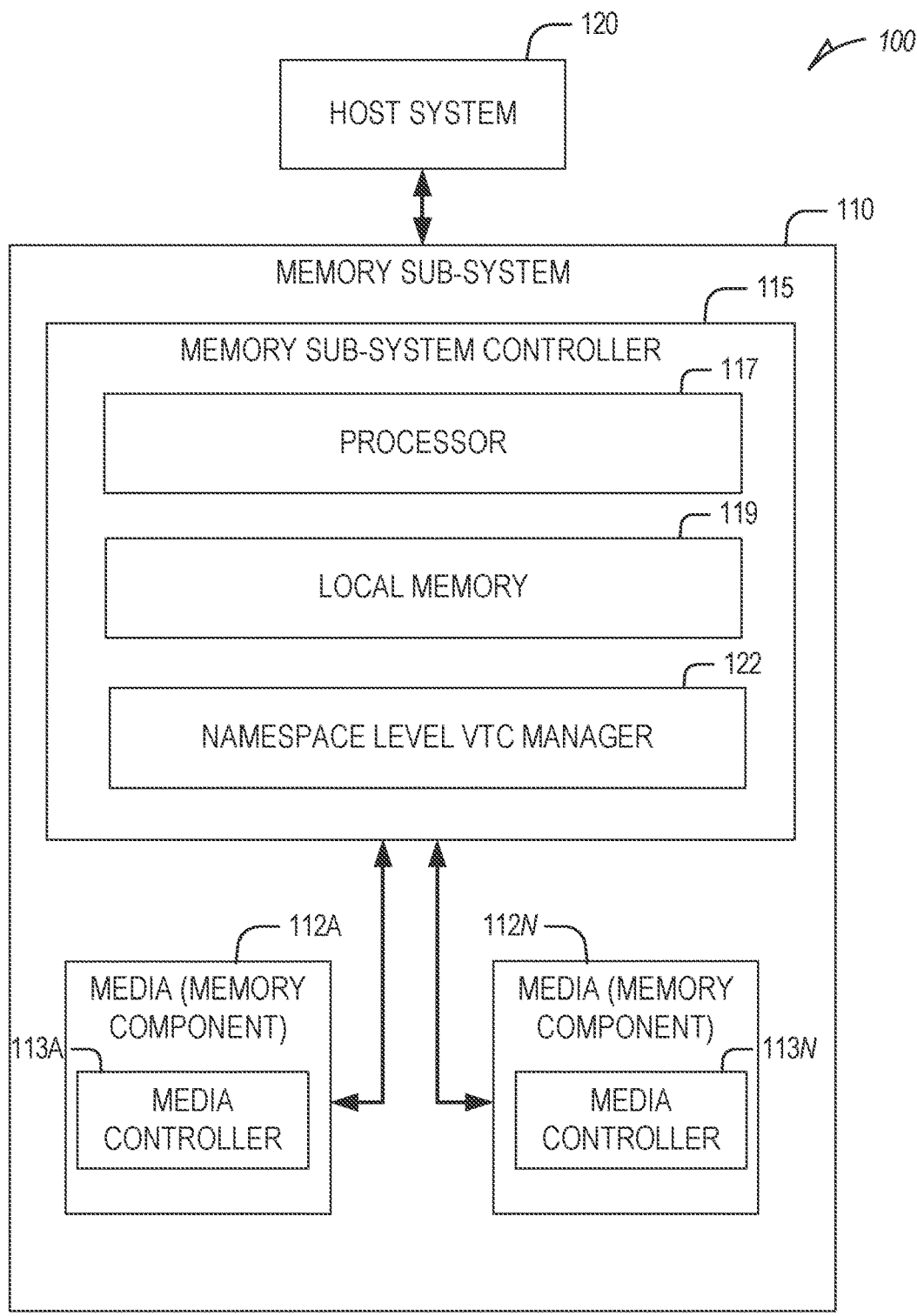
FIG. 1 is a block diagram illustrating an example computing environment including a memory sub-system, in accordance with some embodiments of the present disclosure.

Aspects of the present disclosure configure a system component, such as a memory sub-system controller, to track VTC on a namespace level in a memory sub-system, which can be performed by managing a VTC table on a namespace level. The VTC table can be generated to store the translational unit count on the block level and on the namespace level. Namely, the block level count represents the total number of translational units (TUs) occupied or allocated to multiple namespaces on an individual block. The namespace level count represents the total number of TUs occupied or allocated to one individual namespace on the individual block. This enables the VTC table to quickly be updated when a given namespace is formatted or deleted, which improves the overall efficiency of operating the memory sub-system.

A memory sub-system can be a storage device, a memory module, or a hybrid of a storage device and memory module. Examples of storage devices and memory modules are described below in conjunction with FIG. 1. In general, a host system can utilize a memory sub-system that includes one or more memory components, such as memory devices that store data. The host system can send access requests (e.g., write command, read command) to the memory sub-system, such as to store data at the memory sub-system and to read data from the memory sub-system. The data specified by the host is hereinafter referred to as "host data" or "user data." The data can be stored in the memory sub-system according to namespaces.

Specifically, physical memory elements of a storage device can be arranged as logical memory blocks addressed via Logical Block Addressing (LBA). A logical memory block is the smallest LBA addressable memory unit, and each LBA address identifies a single logical memory block that can be mapped to a particular physical address of a memory unit in the storage device. A Translation Unit (TU) represents a minimal unit transferred from the storage drive's LBAs to the flash storage address. This translation is usually stored in a TU mapping table (L2P Table).

The concept of namespace for storage device is similar to the concept of partition in a hard disk drive for creating logical storages. Different portions of a storage device can be allocated to different namespaces and thus can have LBA addresses configured independently from each other within their respective namespaces. Each namespace identifies a quantity of memory of the storage device addressable via LBA. A same LBA address can be used in different namespaces to identify different memory units in different portions of the storage device. For example, a first namespace allocated on a first portion of the storage device having n memory units can have LBA addresses ranging from 0 to n-1; and a second namespace allocated on a second portion of the storage device having m memory units can have LBA addresses ranging from 0 to m-1.

A host request can include logical address information (e.g., logical block address (LBA), namespace) for the host data, which is the location the host system associates with the host data and a particular namespace in which to store or access the host data. The logical address information (e.g., LBA, namespace) can be part of metadata for the host data. Metadata can also include error handling data (e.g., ECC codeword, parity code), data version (e.g., used to distinguish age of data written), valid bitmap (which LBAs or logical transfer units contain valid data), and so forth. A host computer of the storage device may send a request to the storage device for the creation, deletion, or reservation of a namespace. After a portion of the storage capacity of the storage device is allocated to a namespace, an LBA address in the respective namespace logically represents a particular memory unit in the storage media, although the particular memory unit logically represented by the LBA address in the namespace may physically correspond to different memory units at different time instances (e.g., as in SSDs).

The memory sub-system can initiate media management operations, such as a write operation, on host data that is stored on a memory device. For example, firmware of the memory sub-system may rewrite previously written host data from a location on a memory device (e.g., a portion of a namespace) to a new location as part of garbage collection management operations. The data of the portion of the namespace that is rewritten, for example as initiated by the firmware, is hereinafter referred to as "garbage collection data." "User data" can include host data and garbage collection data. "System data" hereinafter refers to data that is created and/or maintained by the memory sub-system for performing operations in response to host requests and for media management. Examples of system data include, and are not limited to, system tables (e.g., logical-to-physical address mapping table), data from logging, scratch pad data, and so forth.

A memory device can be a non-volatile memory device. A non-volatile memory device is a package of one or more dice. Each die can be comprised of one or more planes. For some types of non-volatile memory devices (e.g., negative-and (NAND) devices), each plane is comprised of a set of physical blocks. For some memory devices, blocks are the smallest area than can be erased. Each block is comprised of a set of pages. Each page is comprised of a set of memory cells, which store bits of data. The memory devices can be raw memory devices (e.g., NAND), which are managed externally, for example, by an external controller. The memory devices can be managed memory devices (e.g., managed NAND), which is a raw memory device combined with a local embedded controller for memory management within the same memory device package. The memory device can be divided into one or more zones where each zone is associated with a different set of host data or user data or application.

There are challenges in efficiently implementing the mapping of LBA addresses defined in multiple namespaces into physical memory elements in the storage device and in efficiently using the storage capacity of the storage device, especially when it is desirable to dynamically allocate, delete, and further allocate on the storage device multiple namespaces with different, varying sizes. In order to track the namespace consumption on the physical memory elements, a VTC table is typically maintained. The VTC table identifies for each block the quantity of TUs that are allocated across one or more namespaces. This way, when the firmware needs to perform garbage collection operations, the firmware can use the VTC table to select which memory blocks to re-write (e.g., selecting the memory blocks with the fewest or greatest quantity of TUs allocated to the namespaces).

In some examples, to format or delete a given namespace from the storage device, such as in the process of performing garbage collection or when a request from a host to delete the individual namespace is received, conventional memory sub-systems may need to perform operations that consume a great deal of resources and time, which leads to increased format times as drive capacity increases. Namely, to delete or format an individual namespace, the firmware first obtains the physical address that the individual namespace's LBA range corresponds to from the L2P table one by one. With each physical address, the physical block in which the data associated with the individual namespace is stored is determined. The TUs containing the data are counted and decremented from the VTC table in order to update the VTC table to reflect the deletion of the namespace from the physical block. The time consumed to perform these operations depends on the size of the individual namespace. After the VTC table is updated, the L2P table is also updated by writing invalid physical addresses to the LBAs of the individual namespace that were stored in the L2P table. This further consumes some amount of time. Together, the time taken to perform operations to update the VTC table and to deallocate the namespace from the L2P table can be unacceptable. This results in lack of efficient resource allocation and use in managing multiple namespaces on a memory sub-system.

Aspects of the present disclosure address the above and other deficiencies by configuring a system component, such as a memory sub-system controller of a memory sub-system, to generate separate namespace level VTC entries or counts in addition to the block level VTC entries or counts. This reduces at least some of the time taken by conventional systems to update the VTC table to accurately track the quantity of TUs allocated to namespaces on individual blocks of the memory. As a result, the time taken to perform namespace format or deletion is significantly reduced and becomes independent of the size of the corresponding namespace being formatted or deleted.

In particular, a memory sub-system controller of some embodiments described herein can generate a plurality of namespaces on the memory sub-system in which a set of memory components include a block. The block can store data for a set of namespaces, of a plurality of namespaces, in one or more translational units. The memory sub-system controller can maintain a table describing a quantity of valid translational unit counts stored on the memory sub-system, such that a first count of valid translational units on the block can be maintained by the table along with a second count of valid translational units, of an individual namespace of the set of namespaces, stored in the one or more translational units of the block. In some embodiments, the table stores a plurality of namespace counts of the set of name spaces (of the plurality of namespaces), a namespace count of the plurality of namespace counts describing a quantity of valid translational units for a corresponding namespace in the set of namespaces.

For some embodiments, a memory sub-system (e.g., memory sub-system controller) can perform a garbage collection operation on the individual block. Specifically, the memory sub-system can search a plurality of counts of valid translational units stored in the table, on a plurality of blocks of the set of memory components, to determine an identified count that satisfies a criterion (e.g., a count that is greater than all other counts or that is below or above a threshold value). The memory sub-system can select an individual block of the plurality of blocks that is associated with the identified count and can perform a garbage collection operation on the individual block in response to selecting the individual block.

For some embodiments, the memory sub-system (e.g., memory sub-system controller) can receive a request to generate a new namespace on the memory sub-system. In response, the memory sub-system (e.g., memory sub-system controller) can selectively add a namespace level VTC entry for the new namespace on the basis of the quantity and/or size of the namespace level entries currently stored in the table. In some examples, the table is stored in a static random access memory (SRAM) device of the memory sub-system. Namely, the memory sub-system (e.g., memory sub-system controller) can determine a number of namespaces currently described by the table (e.g., the VTC table) and compare the number to a threshold value. The threshold value can represent a total number of namespaces that the VTC table can represent. In response to determining that the number is less than the threshold value (e.g., the number of namespaces currently represented by namespace level VTC entries in the VTC table is less than the threshold value, such as 10), the memory sub-system (e.g., memory sub-system controller) can update the table by adding to the table, for each block in the memory sub-system, a new count (e.g., a new entry) describing a quantity of valid TUs that the new namespace has in the respective block. In some examples, when the new namespace is created, the VTC table stores a value of zero in each block for the namespace. The VTC can be incremented in response to write operations after the namespace is created. Namely, the memory sub-system (e.g., memory sub-system controller) can increment the total TUs described by the first count of the number of TUs occupied or allocated to all of the namespaces stored in the respective block in response to write operations to the namespace based on the quantity of TUs associated with the new namespace in the respective block.

In some examples, the creation of a namespace includes two phases. A first phase includes the generation of a VTC for the namespace which describes the quantity of data written in each block of the namespace. This VTC can be initially set to zero and is incremented as blocks are written with data in the namespace. A second phase includes the storage of a total TU count of the namespace which describes the actual size of the namespace regardless of whether data is stored in the namespace. The total TU count can be initially set to the value that indicates how many blocks of data the namespace is capable of storing.

In some embodiments, the memory sub-system (e.g., memory sub-system controller) can determine that the number is greater than the threshold value. In response, the memory sub-system (e.g., memory sub-system controller) can select one of the namespace level VTC entries to delete from the VTC table based on a size of the namespaces represented by the namespace level VTC entry. Specifically, the memory sub-system (e.g., memory sub-system controller) can selectively add an entry to the VTC table for the new namespace on the basis of whether the new namespace is associated with a size that is greater than the size of the smallest namespace entry stored in the VTC table. To do so, the memory sub-system (e.g., memory sub-system controller) can compare the size of the new namespace (e.g., the quantity of TUs associated with the new namespace) with the total TU count values (indicating an actual allocated size or quantity of blocks) described by the namespace level entries of each of the namespaces described by the VTC table. In response to determining that the size of the new namespace is smaller than the size (e.g., the total TU count values) of each of the plurality of namespaces, the memory sub-system (e.g., memory sub-system controller) can increment the first count by a quantity of the valid translational units that the new namespace has in the block and can avoid or not add a new namespace level entry for the new namespace in the VTC table. In some embodiments, in response to determining that the size of the new namespace is greater than the size (e.g., a select count value) of a select one of the plurality of namespaces, the memory sub-system (e.g., memory sub-system controller) can replace the count value of the select one of the plurality of namespaces with a new count value of valid translational units of the new namespace. The memory sub-system (e.g., memory sub-system controller) can store tracking metadata that describes namespaces for which separate counts of valid TUs are stored in the VTC table (e.g., the tracking metadata indicates which namespaces have namespace level entries stored in the VTC table).

In some embodiments, in order to delete or format a namespace from the memory sub-system, the memory sub-system (e.g., memory sub-system controller) can receive a request to format an individual namespace. In response to the request, the memory sub-system (e.g., memory sub-system controller) can search the VTC tracking metadata of the VTC table to determine whether the individual namespace is associated with an individual namespace level entry in the VTC table that describes the quantity of TUs allocated by the individual namespace in each of a set of blocks of the memory sub-system. The memory sub-system (e.g., memory sub-system controller) can obtain the second count associated with the individual namespace in response to determining that the VTC table stores the individual namespace level entry for the individual namespace. The memory sub-system (e.g., memory sub-system controller) can then deduct the second count from the first count (e.g., deduct from the count of the number of valid TUs allocated to multiple namespaces on an individual memory block the total number of TUs allocated to the individual namespace on the individual memory as described by the individual namespace level entry). This significantly expedites and reduces the amount of time taken to update the VTC table to accurately reflect the total quantity of TUs allocated to individual namespaces on each block of the memory sub-system. This is because rather than accessing the L2P table and updating the VTC table for a LBA address stored in the UP table for the individual namespace which consumes multiple operations proportional to a size of the individual namespace, the VTC table is updated in a single operation by obtaining the quantity of TUs allocated to the individual namespace from a separately maintained VTC table entry from the global entry representing the total quantity of TUs allocated across a block for multiple namespaces.

Though various embodiments are described herein as being implemented with respect to a memory sub-system (e.g., a controller of the memory sub-system), some or all of portions of an embodiment can be implemented with respect to a host system, such as a software application or an operating system of the host system.

FIG. 1 illustrates an example computing environment 100 including a memory sub-system 110, in accordance with some examples of the present disclosure. The memory sub-system 110 can include media, such as memory components 112A to 112N (also hereinafter referred to as "memory devices"). The memory components 112A to 112N can be volatile memory devices, non-volatile memory devices, or a combination of such. In some embodiments, the memory sub-system 110 is a storage system. A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and a non-volatile dual in-line memory module (NVDIMM).

The computing environment 100 can include a host system 120 that is coupled to a memory system. The memory system can include one or more memory sub-systems 110. In some embodiments, the host system 120 is coupled to different types of memory sub-system 110. FIG. 1 illustrates one example of a host system 120 coupled to one memory sub-system 110. The host system 120 uses the memory sub-system 110, for example, to write data to the memory sub-system 110 and read data from the memory sub-system 110. As used herein, "coupled to" generally refers to a connection between components, which can be an indirect communicative connection or direct communicative connection (e.g., without intervening components), whether wired or wireless, including connections such as electrical, optical, magnetic, and so forth.

The host system 120 can be a computing device such as a desktop computer, laptop computer, network server, mobile device, embedded computer (e.g., one included in a vehicle, industrial equipment, or a networked commercial device), or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. Examples of a physical host interface include, but are not limited to, a serial advanced technology attachment (SATA) interface, a peripheral component interconnect express (PCIe) interface, a universal serial bus (USB) interface, a Fibre Channel interface, a Serial Attached SCSI (SAS) interface, and so forth. The physical host interface can be used to transmit data between the host system 120 and the memory sub-system 110. The host system 120 can further utilize an NVM Express (NVMe) interface to access the memory components 112A to 112N when the memory sub-system 110 is coupled with the host system 120 by the PCIe interface. The physical host interface can provide an interface for passing control, address, data, and other signals between the memory sub-system 110 and the host system 120.

The memory components 112A to 112N can include any combination of the different types of non-volatile memory components and/or volatile memory components. An example of non-volatile memory components includes a negative-and (NAND)-type flash memory. Each of the memory components 112A to 112N can include one or more arrays of memory cells such as single-level cells (SLCs) or multi-level cells (MLCs) (e.g., TLCs or QLCs). In some embodiments, a particular memory component 112 can include both an SLC portion and an MLC portion of memory cells. Each of the memory cells can store one or more bits of data (e.g., blocks) used by the host system 120. Although non-volatile memory components such as NAND-type flash memory are described, the memory components 112A to 112N can be based on any other type of memory, such as a volatile memory. In some embodiments, the memory components 112A to 112N can be, but are not limited to, random access memory (RAM), read-only memory (ROM), dynamic random access memory (DRAM), synchronous dynamic random access memory (SDRAM), phase change memory (PCM), magnetoresistive random access memory (MRAM), negative-or (NOR) flash memory, electrically erasable programmable read-only memory (EEPROM), and a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write-in-place operation, where a non-volatile memory cell can be programmed without the non-volatile memory cell being previously erased. Furthermore, the memory cells of the memory components 112A to 112N can be grouped as memory pages or blocks that can refer to a unit of the memory component 112 used to store data. In some examples, the memory cells of the memory components 112A to 112N can be grouped into a set of different zones of equal or unequal size used to store data for corresponding applications. In such cases, each application can store data in an associated zone of the set of different zones.

A memory sub-system controller 115 can communicate with the memory components 112A to 112N to perform operations such as reading data, writing data, or erasing data at the memory components 112A to 112N and other such operations. The memory sub-system controller 115 can include hardware such as one or more integrated circuits and/or discrete components, a buffer memory, or a combination thereof. The memory sub-system controller 115 can be a microcontroller, special-purpose logic circuitry (e.g., a field programmable gate array (FPGA), an application specific integrated circuit (ASIC), etc.), or another suitable processor. The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120. In some embodiments, the local memory 119 can include memory registers storing memory pointers, fetched data, and so forth. The local memory 119 can also include read-only memory (ROM) for storing microcode. While the example memory sub-system 110 in FIG. 1 has been illustrated as including the memory sub-system controller 115, in another embodiment of the present disclosure, a memory sub-system 110 may not include a memory sub-system controller 115, and can instead rely upon external control (e.g., provided by an external host, or by a processor 117 or controller separate from the memory sub-system 110).

In general, the memory sub-system controller 115 can receive commands or operations from the host system 120 and can convert the commands or operations into instructions or appropriate commands to achieve the desired access to the memory components 112A to 112N. The memory sub-system controller 115 can be responsible for other operations such as wear leveling operations, garbage collection operations, error detection and error-correcting code (ECC) operations, encryption operations, caching operations, address translations between a logical block address and a physical block address that are associated with the memory components 112A to 112N, and address translations between an application identifier received from the host system 120 and a corresponding zone of a set of zones of the memory components 112A to 112N. This can be used to restrict applications to reading and writing data only to/from a corresponding namespace of the set of namespace that is associated with the respective applications. In such cases, even though there may be free space elsewhere on the memory components 112A to 112N, a given application can only read/write data to/from the associated namespace, such as by erasing data stored in the namespace and writing new data to the namespace. The memory sub-system controller 115 can further include host interface circuitry to communicate with the host system 120 via the physical host interface. The host interface circuitry can convert the commands received from the host system 120 into command instructions to access the memory components 112A to 112N as well as convert responses associated with the memory components 112A to 112N into information for the host system 120.

The memory sub-system 110 can also include additional circuitry or components that are not illustrated. In some embodiments, the memory sub-system 110 can include a cache or buffer (e.g., DRAM or other temporary storage location or device) and address circuitry (e.g., a row decoder and a column decoder) that can receive an address from the memory sub-system controller 115 and decode the address to access the memory components 112A to 112N.

The memory devices can be raw memory devices (e.g., NAND), which are managed externally, for example, by an external controller (e.g., memory sub-system controller 115). The memory devices can be managed memory devices (e.g., managed NAND), which is a raw memory device combined with a local embedded controller (e.g., local media controllers) for memory management within the same memory device package. Any one of the memory components 112A to 112N can include a media controller (e.g., media controller 113A and media controller 113N) to manage the memory cells of the memory component, to communicate with the memory sub-system controller 115, and to execute memory requests (e.g., read or write) received from the memory sub-system controller 115.

The memory sub-system 110 includes a namespace level VTC manager 122 that performs or facilitates VTC table management, in accordance with some embodiments described herein. In some embodiments, the controller 115 includes at least a portion of the namespace level VTC manager 122. For example, the controller 115 can include a processor 117 (processing device) configured to execute instructions stored in local memory 119 for performing the operations described herein. In some embodiments, the namespace level VTC manager 122 is part of the host system 120, such as a software application or an operating system on the host system 120.

The namespace level VTC manager 122 can store a VTC table that describes the quantity of valid TUs each namespace has in each block of the memory components 112A to 112N. For example, the VTC table can store two sets of entries including count values for each block of the memory components 112A to 112N. A first count stored in a first entry on the VTC table can be associated with a first block and can represent the total quantity (global count) of valid TUs that are stored across one or more namespaces on the first block. A second entry can be stored for each or a subset of the one or more namespaces stored on the first block. The second entry can include a first count value representing a quantity of valid TUs that are stored for a first of the one or more namespaces on the first block. The second entry can also include a second count value representing a quantity of valid TUs that are stored for a second of the one or more namespaces on the first block. The total number of count values that are stored by the second entry can be predetermined and set by a threshold value. In some examples, the VTC table can be configured to only store up to a maximum of 10 count values in the second entry (e.g., the VTC table can be configured to only store separate namespace level VTC count values for 10 namespaces).

Similarly, a third count stored in a third entry on the VTC table can be associated with a second block and can represent the total quantity of valid TUs that are stored across one or more namespaces on the second block. A fourth entry can be stored for each or a subset of the one or more namespaces stored on the second block. The fourth entry can include a fourth count value representing a quantity of valid TUs that are stored for the first of the one or more namespaces on the second block. The fourth entry can also include a fifth count value representing a quantity of valid TUs that are stored for the second of the one or more namespaces on the second block.

In some embodiments, the namespace level VTC manager 122 manages updates to the VTC table as new namespaces are added and old namespaces are deleted or formatted from the memory components 112A to 112N. For example, to expedite the VTC table update when an old namespace is deleted or removed, the VTC manager 122 uses the namespace level entry stored for the old namespace in the VTC table to update the global or block level count for an individual block of the memory components.

For example, in some embodiments, the VTC manager 122 can receive a request to delete the first namespace. In response to receiving a request to delete the first namespace, the VTC manager 122 can access tracking metadata to determine whether the first namespace has a corresponding namespace level VTC entry stored in the VTC table. If so, the VTC manager 122 accesses the VTC table, such as the second entry that includes the first count value representing the quantity of valid TUs that are stored for the first namespace on the first block. The VTC manager 122 then deducts the first count value from the first count stored in the first entry on the VTC table associated with the first block to represent the total quantity (global count) of valid TUs that are stored across one or more namespaces on the first block. The VTC manager 122 then determines whether additional blocks store valid TUs for the first namespace. The VTC manager 122 similarly accesses the VTC table, such as the fourth entry that includes the fourth count value representing the quantity of valid TUs that are stored for the first namespace on the second block. The VTC manager 122 then deducts the fourth count value from the third count stored in the third entry on the VTC table associated with the second block to represent the total quantity (global count) of valid TUs that are stored across one or more namespaces on the second block. The VTC manager 122 then performs operations to deallocate the first namespace from the L2P table, such as by writing invalid physical addresses to a logical-to-physical (L2P) mapping table of logical block address to physical address associated with the first namespace.

For example, in some embodiments, the VTC manager 122 can receive a request to add a new namespace to the memory components 112A to 112N. In response, the VTC manager 122 can selectively add a namespace level VTC entry for the new namespace on the basis of whether the total number of namespaces that include corresponding entries in the VTC table exceeds a threshold value (e.g., 10) and/or on the basis of whether a size of the new namespace is greater than a quantity or size of the allocated TUs of any of the namespaces described by the VTC table.

Specifically, the VTC manager 122 can determine that the total number of namespaces that include corresponding entries in the VTC table fails to transgress or exceed the threshold value. In such cases, the VTC manager 122 determines the quantity of TUs that are stored on a first block for the new namespace and generates a new count value for the namespace level entry associated with the first block. The new count value includes or describes the quantity of TUs that are stored on the first block for the new namespace. The new count value is stored together with other count values in the VTC table that describe the quantity of TUs that are stored for other namespaces on the first block. Similarly, the VTC manager 122 determines the quantity of TUs that are stored on a second block for the new namespace and generates a second new count value for the namespace level entry associated with the second block. The second new count value includes or describes the quantity of TUs that are stored on the second block for the new namespace.

In some embodiments, the VTC manager 122 can determine that the total number of namespaces that include corresponding entries in the VTC table transgresses or exceeds the threshold value (e.g., 10 namespaces are currently represented by individual namespace level VTC entries in the VTC table). In such cases, the VTC manager 122 can determine a size of the new namespace (e.g., how many TUs are associated with the new namespace). The VTC manager 122 can obtain the count values of the TUs stored for each of the namespaces currently described by respective namespace level VTC entries in the VTC table. For example, the VTC manager 122 accesses the tracking metadata and accumulates all of the count values stored in the namespace level VTC entry for a first namespace on all of the blocks. This represents the total amount of TUs that are allocated for the first namespace. The VTC manager 122 can compare the total amount of TUs allocated for the first namespace to the quantity of TUs that are associated with the new namespace. In response to determining that the total amount of TUs allocated for the first namespace is greater than the quantity of TUs that are associated with the new namespace, the VTC manager 122 can select a second namespace to analyze.

The VTC manager 122 can access the tracking metadata and accumulates all of the count values stored in the namespace level VTC entry for the second namespace on all of the blocks. This represents the total amount of TUs that are allocated for the second namespace. The VTC manager 122 can compare the total amount of TUs allocated for the second namespace to the quantity of TUs that are associated with the new namespace. In response to determining that the total amount of TUs allocated for the second namespace is greater than the quantity of TUs that are associated with the new namespace, the VTC manager 122 can select a third namespace to analyze. The VTC manager 122 repeats these operations until all of the namespaces described by the VTC table are analyzed. In response to determining that the total amount of TUs allocated for each of the namespaces is greater than the quantity of TUs that are associated with the new namespace, the VTC manager 122 can avoid generating a new entry in the VTC table that is specific to the new namespace.

In some embodiments, the VTC manager 122 can determine that the total amount of TUs allocated for a third namespace is less than the quantity of TUs that are associated with the new namespace. In such cases, the VTC manager 122 can swap the namespace level entries in the VTC table for the third namespace with the count values associated with the new namespace. To do so, the VTC manager 122 deletes all of the count values associated with the third namespace from the VTC table and removes the third namespace from the tracking metadata. The VTC manager 122 repeats this process for each block in the memory sub-system. The VTC manager 122 also adds an identifier of the new namespace to the tracking metadata indicating that the VTC table stores count values specific to the new namespace.

Depending on the embodiment, the namespace level VTC manager 122 can comprise logic (e.g., a set of transitory or non-transitory machine instructions, such as firmware) or one or more components that causes the memory sub-system 110 (e.g., the memory sub-system controller 115) to perform operations described herein with respect to the namespace level VTC manager 122. The namespace level VTC manager 122 can comprise a tangible or non-tangible unit capable of performing operations described herein. Further details with regards to the operations of the namespace level VTC manager 122 are described below.

Figure 2:
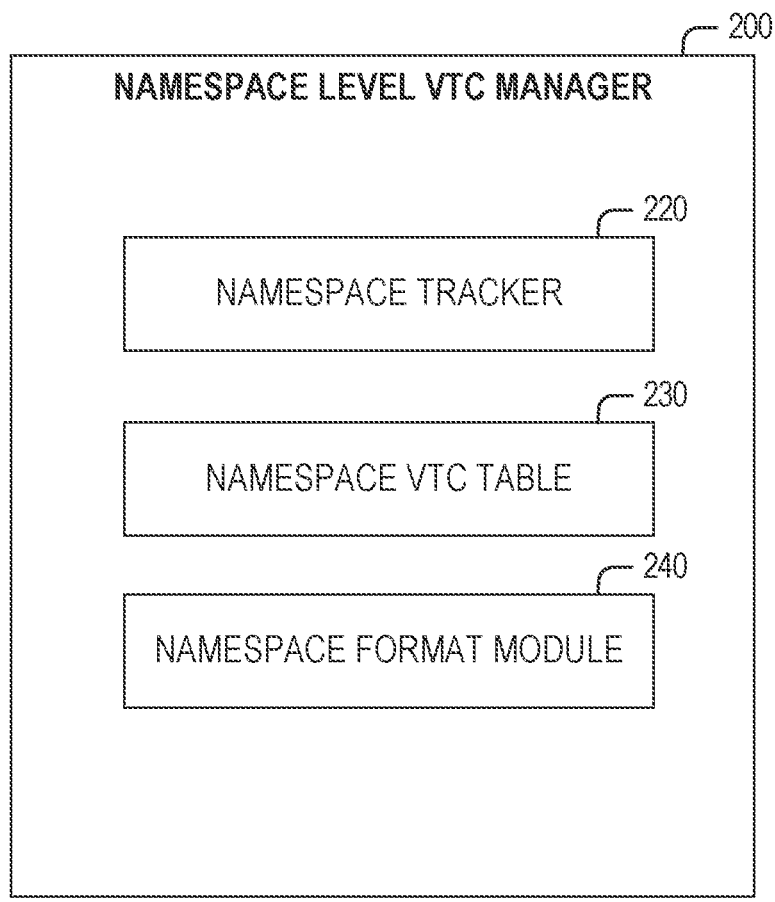
FIG. 2 is a block diagram of an example namespace level Valid Translational Unit Count (VTC) manager, in accordance with some implementations of the present disclosure.

FIG. 2 is a block diagram of an example namespace level VTC manager 200, in accordance with some implementations of the present disclosure. As illustrated, the namespace level VTC manager 200 includes a namespace tracker 220, a namespace VTC table 230, and a namespace format module 240. For some embodiments, the namespace level VTC manager 200 can differ in components or arrangement (e.g., less or more components) from than what is illustrated in FIG. 2.

The namespace tracker 220 stores tracking metadata that identifies which namespaces are associated with namespace level entries in the VTC table. Specifically, if a namespace count value representing a total quantity of valid TUs is stored for an individual namespace in the VTC table (in addition to the global count value representing valid TUs across each of a set of blocks of the memory sub-system), the tracking metadata specifies an identifier of the individual namespace. As namespaces are added or deleted, the tracking metadata is similarly updated to add or remove namespace identifiers respectively.

The namespace VTC table 230 stores a plurality of entries that describe a global count for each block indicating total number of valid TUs (across multiple namespaces stored in the respective block). The plurality of entries also separately store individual count values for each namespace for each block. For example, a first count can be stored for a first block describing a total quantity of valid TUs a first namespace is allocated or stores on the first block and a second count can be stored for the first block describing a total quantity of valid TUs a second namespace is allocated or stores on the first block. These first and second counts are stored in addition to the global count for the first block.

The namespace format module 240 performs operations for adding and removing namespaces from the descriptions in the VTC table. Specifically, the namespace format module 240 can perform operations including generating a plurality of namespaces on a memory sub-system comprising a set of memory components including a block, the block storing data for a set of namespaces, of the plurality of namespaces, in one or more translational units. The namespace format module 240 can communicate with the namespace VTC table 230 and the namespace tracker 220 to maintain the table describing a quantity of valid translational unit counts stored on the memory sub-system.

Figure 3:
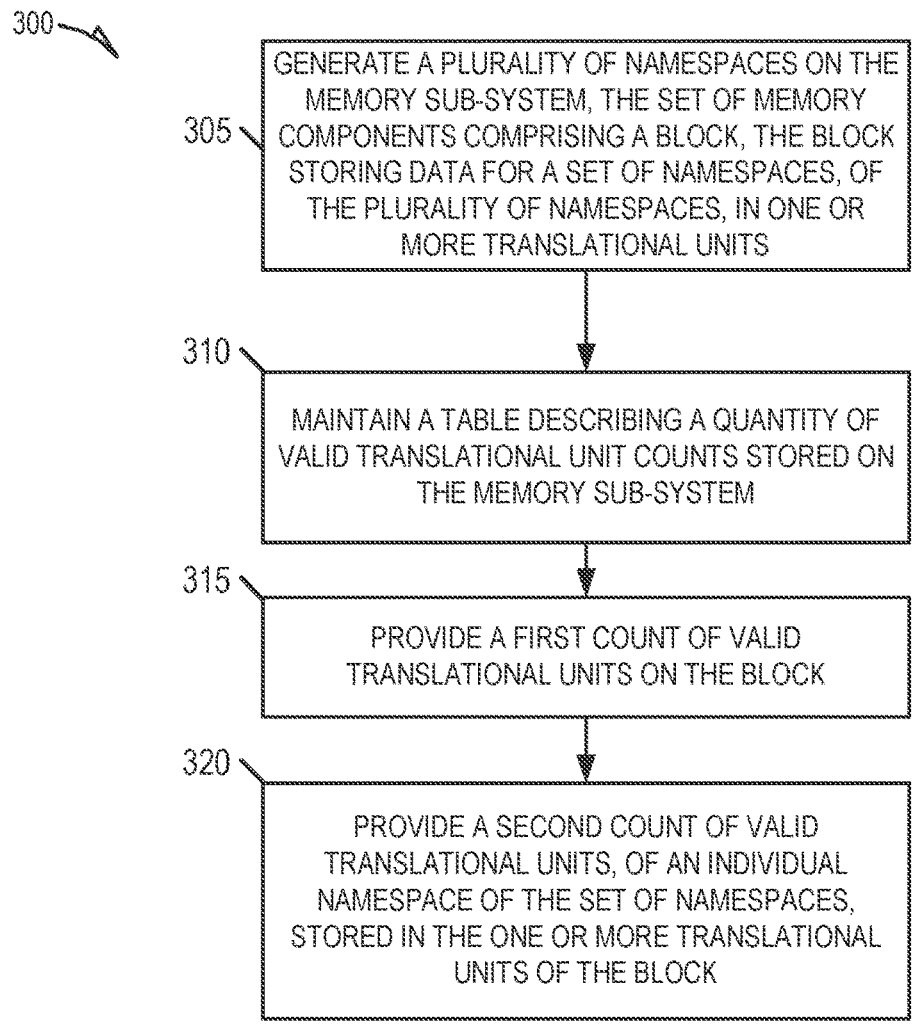
FIGS. 3 and 4 are flow diagrams of example methods to perform VTC table management, in accordance with some implementations of the present disclosure.
Figure 4:
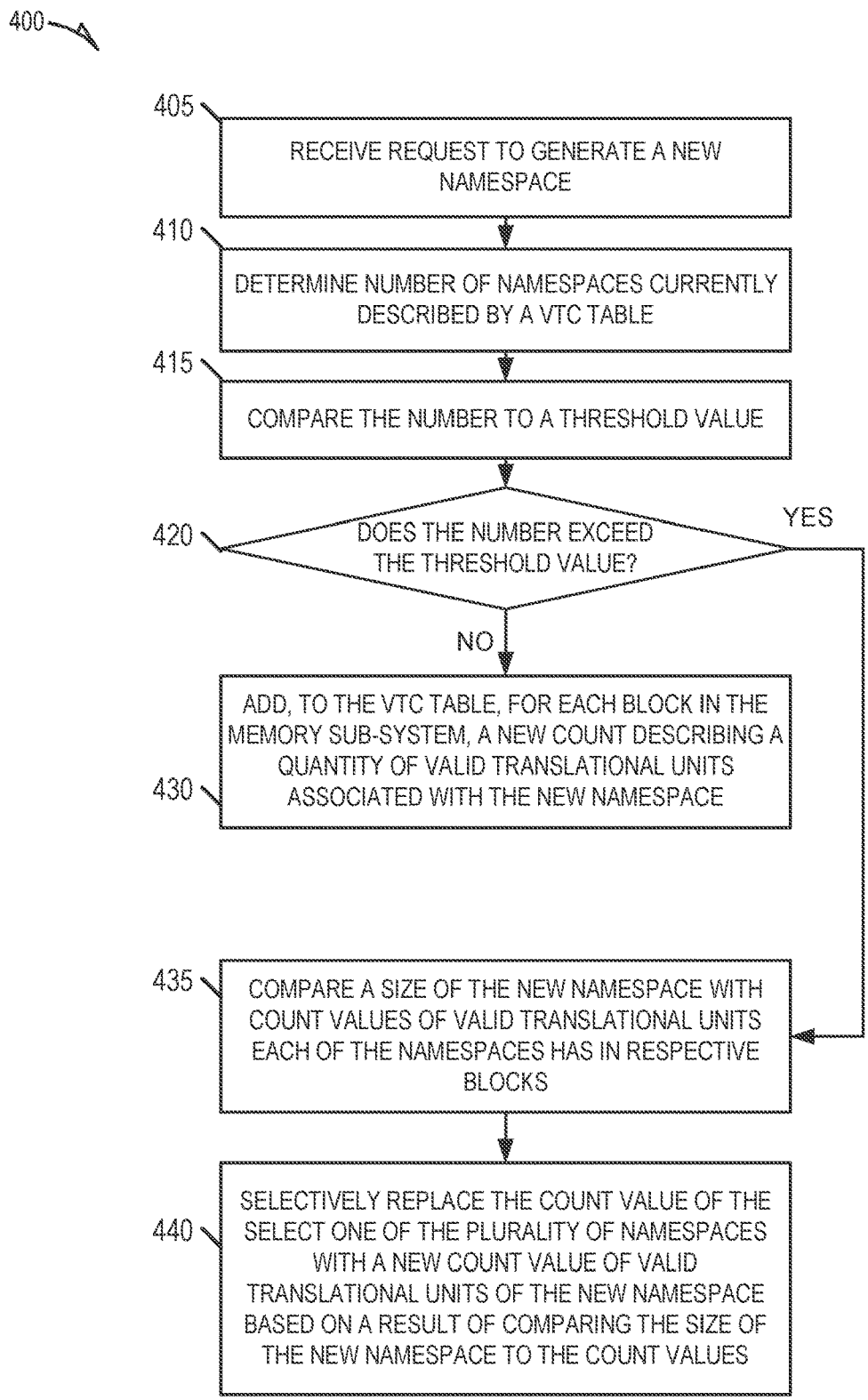

FIGS. 3 and 4 are flow diagrams of example methods 300, 400 to perform VTC table management, in accordance with some implementations of the present disclosure. Either of the methods 300, 400 can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, the method 300 is performed by the memory sub-system controller 115 of FIG. 1. In these embodiments, the method 300 or the method 400 can be performed, at least in part, by the namespace level VTC manager 122. Although the processes are shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Referring now FIG. 3, the method (or process) 300 begins at operation 305, with a processing device of a memory sub-system (e.g., of processor of the memory sub-system controller 115) generating a plurality of namespaces on the memory components (e.g., the memory components 112A to 112N) of the memory sub-system that include a block or blocks. Each block stores data for a set of namespaces of the plurality of namespaces in one or more translational units. For some embodiments, the request is from a host system (e.g., the host system 120) communicatively coupled to the memory sub-system.

At operation 310, the processing device of the memory sub-system maintains a table (e.g., a VTC table) describing a quantity of VTC stored on the memory components (e.g., the memory components 112A to 112N) of the memory sub-system.

Thereafter, at operation 315, the table provides a first count of valid translational units of an individual block of the plurality of blocks of the memory components (e.g., the memory components 112A to 112N) of the memory sub-system.

At operation 320, the table provides a second count of valid translational units of an individual namespace of the set of namespaces stored in the one or more translational units of the block.

Referring now FIG. 4, the method (or process) 400 begins at operation 405, with a processing device of a memory sub-system receiving a request to generate a new namespace.

At operation 410, the processing device can determine a number of namespaces currently described by a VTC table. Thereafter, at operation 415, the processing device can compare the number to a threshold value. The processing device, at operation 420, can determine whether the number exceeds the threshold value. In response to determining that the number exceeds the threshold value, the process proceeds to operation 435. In response to determining that the number does not exceed the threshold value, the process proceeds to operation 430. Then, at operation 430, the processing device can add, to the VTC table, for each block in the memory sub-system, a new count describing a quantity of valid translational units associated with the new namespace.

The processing device can compare a size of the new namespace with count values of valid translational units that each of the namespaces has in respective blocks at operation 435. Then, at operation 440, the processing device can selectively replace the count value of the select one of the plurality of namespaces with a new count value of valid translational units of the new namespace based on a result of comparing the size of the new namespace to the count values.

FIG. 5 presents a table 500 that illustrates an example of an VTC table, in accordance with some embodiments. As shown in FIG. 5, the table 500 includes an entry for each block in the memory sub-system. Specifically, a first block 510 (e.g., block 0) can include an entry in a global VTC column 520 and one or more individual entries in namespace level VTC columns 530, 532, and 534. In some examples, the global VTC column 520 includes a count value representing a total quantity of valid TUs that are allocated to each of the namespaces stored in the first block 510. The entry in the namespace level VTC column 530 includes a first count value of the total quantity of valid TUs that are allocated to a first namespace stored in the first block 510; the entry in the namespace level VTC column 532 includes a second count value of the total quantity of valid TUs that are allocated to a second namespace stored in the first block 510; and the entry in the namespace level VTC column 534 includes a third count value of the total quantity of valid TUs that are allocated to a third namespace stored in the first block 510.

Similarly, a second block (e.g., block 1) can include a second entry in the global VTC column 520 and one or more individual entries in the namespace level VTC columns 530, 532 and 534. For example, the entry of the global VTC column 520 includes a count value representing a total quantity of valid TUs that are allocated to each of the namespaces stored in the second block. The entry in the namespace level VTC column 530 includes a fourth count value of the total quantity of valid TUs that are allocated to the first namespace stored in the second block; the entry in the namespace level VTC column 532 includes a fifth count value of the total quantity of valid TUs that are allocated to the second namespace stored in the second block; and the entry in the namespace level VTC column 534 includes a sixth count value of the total quantity of valid TUs that are allocated to the third namespace stored in the second block.

In some examples, to delete the second namespace from the memory sub-system, the namespace level VTC manager 122 can access tracking metadata to identify the count values stored in the VTC table (table 500) for the second namespace. For example, the namespace level VTC manager 122 can determine that the first block 510 stores a count value of 300 in the entry in the namespace level VTC column 532 for the second namespace. To delete or format the second namespace, the namespace level VTC manager 122 decrements the corresponding entry in the global VTC column 520 (e.g., 1000) by the count value of 300 in the entry in the namespace level VTC column 532 in a single operation. In this case, the corresponding entry in the global VTC column 520 is reduced to the value of 700 valid TUs in the single operation. This process is repeated across all of the memory blocks followed by removal of the second namespace from the tracking metadata. The second namespace is then de-allocated from the L2P table.

Figure 6:
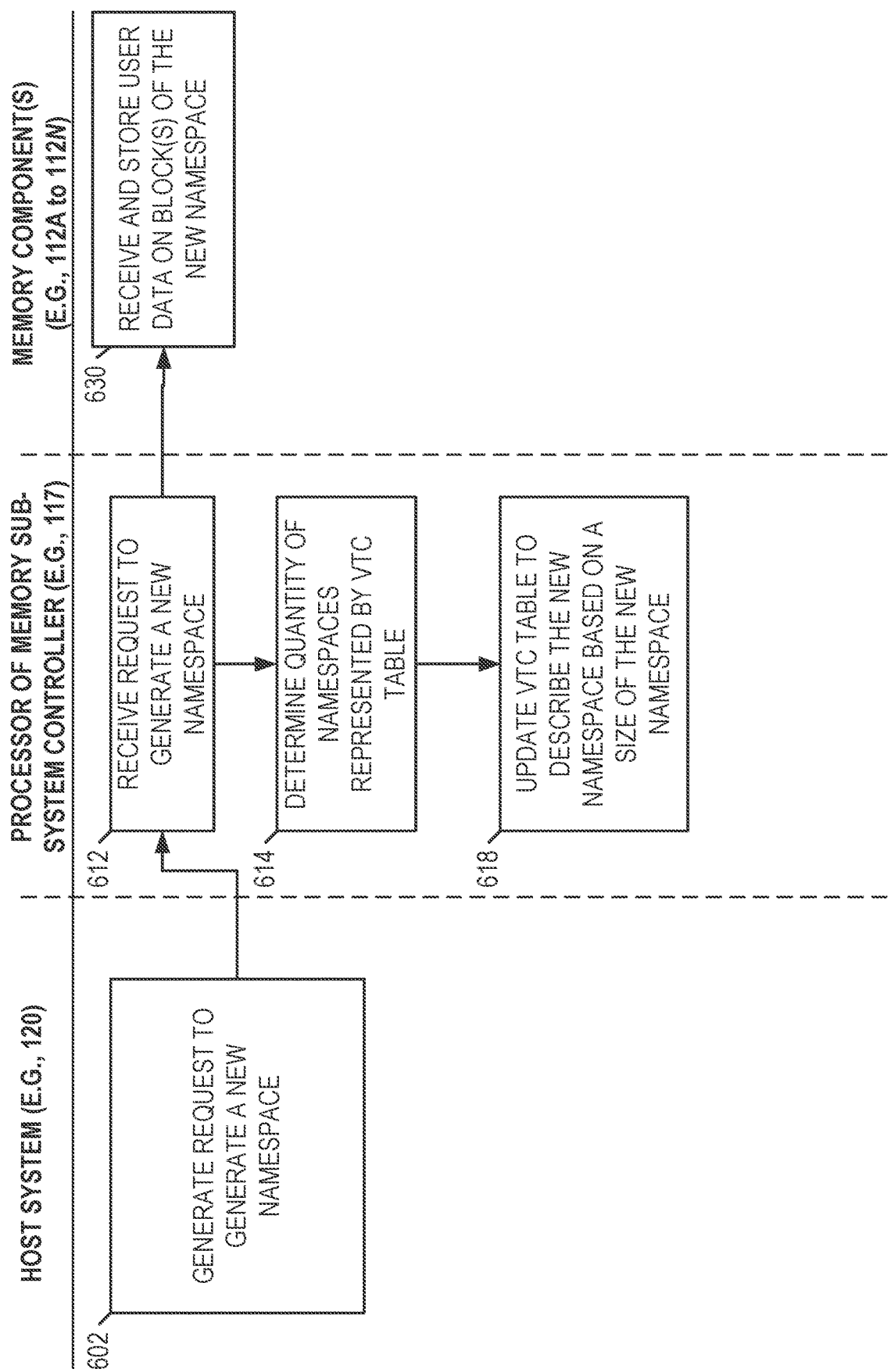
FIG. 6 provides an interaction diagram illustrating interactions between components of the computing environment in the context of some embodiments in which a method of VTC table management is performed.

FIG. 6 provides an interaction diagram illustrating interactions between components of the computing environment 100 in the context of some embodiments in which a method of VTC table management is performed. The operations of the method can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, the method is performed by the memory sub-system controller 115. Although the operations are shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment.

In the context of the example illustrated in FIG. 6, the host system can comprise the host system 120, the processor of the memory sub-system controller can comprise the processor 117 of the memory sub-system 110, and the one or more memory components can comprise at least one of the memory components 112A to 112N.

As shown in FIG. 6, at operation 602, the host system (e.g., via a processor of the host system 120) generates a request to generate a new namespace on the memory component(s) and, at operation 612, the processor of the memory sub-system controller receives the request to generate the new namespace from the host system. The memory components at operation 630 receive and store user data on block(s) of the new namespace.

At operation 614, the processor of the memory sub-system controller determines a quantity of namespaces currently represented by the VTC table.

At operation 618, the processor of the memory sub-system controller updates the VTC table to describe the new namespace based on a size of the new namespace.

Figure 7:
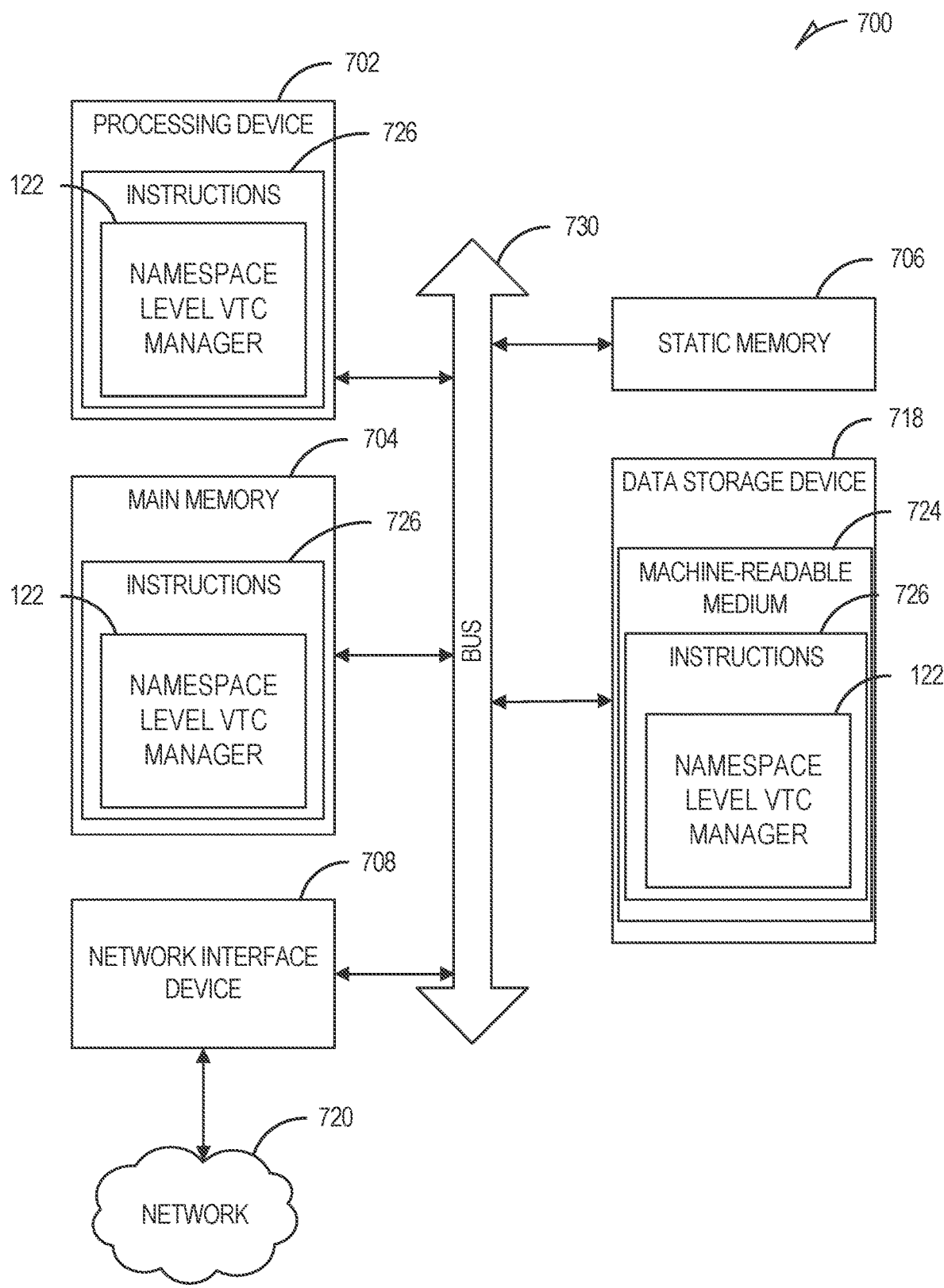
FIG. 7 is a block diagram illustrating a diagrammatic representation of a machine in the form of a computer system within which a set of instructions can be executed for causing the machine to perform any one or more of the methodologies discussed herein, in accordance with some embodiments of the present disclosure.

FIG. 7 illustrates an example machine in the form of a computer system 700 within which a set of instructions, for causing the machine to perform any one or more of the methodologies discussed herein, can be executed. In some embodiments, the computer system 700 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the namespace level VTC manager 122 of FIG. 1). In alternative embodiments, the machine can be connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a network switch, a network bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage system 718, which communicate with each other via a bus 730.

The processing device 702 represents one or more general-purpose processing devices such as a microprocessor, a central processing unit, or the like. More particularly, the processing device 702 can be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 702 can also be one or more special-purpose processing devices such as an application specific integrated circuit (ASIC), a field programmable gate array (FPGA), a digital signal processor (DSP), a network processor, or the like. The processing device 702 is configured to execute instructions 726 for performing the operations and steps discussed herein. The computer system 700 can further include a network interface device 708 to communicate over a network 720.

The data storage system 718 can include a machine-readable storage medium 724 (also known as a computer-readable medium) on which is stored one or more sets of instructions 726 or software embodying any one or more of the methodologies or functions described herein. The instructions 726 can also reside, completely or at least partially, within the main memory 704 and/or within the processing device 702 during execution thereof by the computer system 700, with the main memory 704 and the processing device 702 also constituting machine-readable storage media. The machine-readable storage medium 724, data storage system 718, and/or main memory 704 can correspond to the memory sub-system 110 of FIG. 1.

In one embodiment, the instructions 726 include instructions to implement functionality corresponding to a namespace level VTC manager (e.g., the namespace level VTC manager 122 of FIG. 1). While the machine-readable storage medium 724 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system's memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer-readable storage medium, such as, but not limited to, any type of disk including floppy disks, optical disks, CD-ROMs, and magnetic-optical disks; read-only memories (ROMs); random access memories (RAMs); erasable programmable read-only memories (EPROMs); EEPROMs; magnetic or optical cards; or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description above. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine-readable (e.g., computer-readable) storage medium such as a read-only memory (ROM), random access memory (RAM), magnetic disk storage media, optical storage media, flash memory components, and so forth.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
   a set of memory components of a memory sub-system; and
   a processing device, operatively coupled to the set of memory components, configured to perform operations comprising:
   generating a plurality of namespaces on the memory sub-system, the set of memory components comprising an individual block to store data for the plurality of namespaces, in one or more translational units;
   maintaining a table describing a quantity of valid translational unit counts stored on the memory sub-system, the table comprising:
     a first count of representing a total number of valid translational units on the individual block; and
     a second count representing distribution of the total number of valid translational units across each of the plurality of namespaces for which the data is stored in the individual block;
   receiving one or more requests from a host device to add one or more new namespaces to the memory sub-system or remove one or more existing namespaces from the memory sub-system; and
   in response to receiving the one or more requests from the host device, processing data stored in the table to add the one or more new namespaces to the individual block or remove a portion of the plurality of namespaces allocated to the individual block.

2. The system of claim 1, the operations comprising:
   searching a plurality of counts of valid translational units, on a plurality of blocks of the set of memory components, to determine an identified count that satisfies a criterion;
   selecting a particular block of the plurality of blocks that is associated with the identified count; and
   performing a garbage collection operation on the particular block in response to selecting the particular block.

3. The system of claim 1, wherein the second count represents a quantity of translational units that the individual namespace has in the individual block.

4. The system of claim 1, wherein the table stores a plurality of namespace counts of the plurality of namespaces, a namespace count of the plurality of namespace counts describing a quantity of valid translational units for a corresponding namespace in the plurality of namespaces.

5. The system of claim 1, the operations comprising:
   receiving a request to generate a new namespace on the memory sub-system; and
   in response to receiving the request:
   determining a number of namespaces currently described by the table;
   comparing the number to a threshold value; and
   updating the table based on a result of the comparing of the number to the threshold value.

6. The system of claim 5, the operations comprising:
   determining whether the number is less than the threshold value; and
   in response to determining that the number is less than the threshold value:
   adding to the table, for each block in the memory sub-system, a new count describing a size of the new namespace; and
   incrementing the first count by a quantity of valid translational units that the new namespace has in the block.

7. The system of claim 5, the operations comprising:
   determining whether the number is greater than or equal to the threshold value; and
   in response to determining that the number is greater than or equal to the threshold value:
   comparing a size of the new namespace with sizes of each of the plurality of namespaces; and
   in response to determining that the size of the new namespace is smaller than sizes of the plurality of namespaces, incrementing the first count by a quantity of the valid translational units that the new namespace has in the block.

8. The system of claim 5, the operations comprising:
   determining whether the number is greater than or equal to the threshold value; and
   in response to determining that the number is greater than or equal to the threshold value:
   comparing a size of the new namespace with sizes of each of the plurality of namespaces; and
   in response to determining that the size of the new namespace is greater than a size of a select one of the plurality of namespaces, replacing a count value of the select one of the plurality of namespaces with a new count value of valid translational units of the new namespace.

9. The system of claim 1, the operations comprising:
receiving a request to format the individual namespace; and in response to receiving the request:
obtaining the second count associated with the individual namespace; and
deducting the second count from the first count.

10. The system of claim 9, the operations comprising:
removing the second count from the table.

11. The system of claim 9, the operations comprising:
storing tracking metadata describing namespaces for which separate counts of valid translational units are stored in the table.

12. The system of claim 11, the operations comprising:
determining that the individual namespace is included in the tracking metadata, the second count being obtained and deducted from the first count in response to determining that the individual namespace is included in the tracking metadata.

13. The system of claim 9, the operations comprising:
deallocating each of a plurality of logical block addresses associated with the individual namespace, the deallocating comprising writing invalid physical addresses to a logical-to-physical (L2P) mapping table of logical block address to physical address associated with the individual namespace.

14. The system of claim 1, wherein the table is stored on a static random access memory (SRAM) device of the memory sub-system.

15. A method comprising:
generating a plurality of namespaces on a memory sub-system comprising a set of memory components including an individual block to store data for the plurality of namespaces, in one or more translational units;

maintaining a table describing a quantity of valid translational unit counts stored on the memory sub-system, the table comprising:
a first count of representing a total number of valid translational units on the individual block; and
a second count representing distribution of the total number of valid translational units across each of the plurality of namespaces for which the data is stored in the individual block; and receiving one or more requests from a host device to add one or more new namespaces to the memory sub-system or remove one or more existing namespaces from the memory sub-system; and in response to receiving the one or more requests from the host device, processing data stored in the table to add the one or more new namespaces to the individual block or remove a portion of the plurality of namespaces allocated to the individual block.

16. The method of claim 15, further comprising:
searching a plurality of counts of valid translational units, on a plurality of blocks of the set of memory components, to determine an identified count that satisfies a criterion;
selecting a particular block of the plurality of blocks that is associated with the identified count; and
performing a garbage collection operation on the particular block in response to selecting the particular block.

17. The method of claim 15, wherein the second count represents a quantity of translational units that the individual namespace has in the individual block.

18. The method of claim 15, wherein the table stores a plurality of namespace counts of the plurality of namespaces, a namespace count of the plurality of namespace counts representing a quantity of valid translational units for a corresponding namespace in the set of namespaces.

19. A non-transitory computer-readable storage medium comprising instructions that, when executed by a processing device, cause the processing device to perform operations comprising:
generating a plurality of namespaces on a memory sub-system comprising a set of memory components including an individual block to store data for the plurality of namespaces, in one or more translational units;

maintaining a table describing a quantity of valid translational unit counts stored on the memory sub-system, the table comprising:
a first count of representing a total number of valid translational units on the individual block; and
a second count representing distribution of the total number of valid translational units across each of the plurality of namespaces for which the data is stored in the individual block; and receiving one or more requests from a host device to add one or more new namespaces to the memory sub-system or remove one or more existing namespaces from the memory sub-system; and in response to receiving the one or more requests from the host device, processing data stored in the table to add the one or more new namespaces to the individual block or remove a portion of the plurality of namespaces allocated to the individual block.

20. The non-transitory computer-readable storage medium of claim 19, the operations comprising:
searching a plurality of counts of valid translational units, on a plurality of blocks of the set of memory components, to determine an identified count that satisfies a criterion;
selecting a particular block of the plurality of blocks that is associated with the identified count; and
performing a garbage collection operation on the particular block in response to selecting the particular block.

* * * * *